United States Patent [19]

Tasaki

[11] Patent Number: 5,135,160
[45] Date of Patent: Aug. 4, 1992

[54] PORTABLE BAR CODE READER UTILIZING PULSED LED ARRAY

[75] Inventor: Shinichi Tasaki, Toda, Japan

[73] Assignee: Opticon, Inc., Orangeburg, N.Y.

[21] Appl. No.: 570,162

[22] Filed: Aug. 17, 1990

[51] Int. Cl.⁵ .................. G06K 7/10; G06K 13/00
[52] U.S. Cl. .................... 235/462; 235/476
[58] Field of Search .................. 235/462, 375, 476

[56] References Cited

U.S. PATENT DOCUMENTS

| | | | |
|---|---|---|---|
| 4,682,015 | 7/1987 | Quan | 235/472 |
| 4,734,566 | 3/1988 | Senda et al. | 235/455 |
| 4,809,351 | 2/1989 | Abramovitz | 235/474 |
| 4,877,949 | 10/1989 | Danielson et al. | 235/462 |
| 4,988,852 | 1/1991 | Krishnan | 235/462 |

Primary Examiner—Stuart S. Levy
Assistant Examiner—Richard M. Weinberg
Attorney, Agent, or Firm—Abelman Frayne & Schwab

[57] ABSTRACT

A bar code reader is provided with an LED array containing at least one LED which when energized directs light upon a bar code. A linear CCD array receives a portion of the light directed by the LED array onto the bar code and thereafter reflected from the bar code onto the CCD array. The CCD array receives such reflected light and absorbs the energy therein. This energy has a value at which the CCD array will accumulate a sufficiency of electrical charge during a first period, the CCD array delivering said charge to a shift register during an immediately following second period. A circuit energizes the LED array to emit at least one pulse of light during a small fraction of said first period. The energy contained in the pulse is sufficient to enable the CCD array to properly accumulate the charge.

2 Claims, 3 Drawing Sheets

PORTABLE BAR CODE READER UTILIZING PULSED LED ARRAY

BACKGROUND OF THE INVENTION

A known type of portable bar code reader directs light from a linear array of light emitting diodes [LEDS] onto a printed bar code, and a portion of this light is reflected and directed onto a linear array of charge coupled diodes [CCDS]. The reflected light is received by the CCD array during a first time period and causes a resultant accumulation or build up of electric charge thereon which is monatonically related to the particular code. During a second and immediately successive time period, in the absence of reflected light, the charge on the CCD array is transferred to a shift register which then delivers the resultant electrical date in series form via an amplifier and digitizer to a T L logic output at which the data appears in binary form. The output of the amplifier and digitizer is also fed to an decoder which typically outputs the code as read in ASCII format. The timing and sequence of the two periods is controlled by a timing circuit connected to the CCD array and the shift register.

The light emitted by the LED array is maintained at a relatively constant value so that the total energy of the light reflected onto the CCD array is sufficient to insure proper operation of the CCD array.

However, if, during the first period, the reader position is changed appreciably with respect to the bar code being read, the resultant reading can be blurred or even destroyed. This problem arises because such changes in position changes the pattern of reflected light and adversely affects the pattern and content of the charge built up on the CCD array. Hence the reader must be held in such manner that its position is not changed.

The prior art has recognized the desirability of minimizing the length of time in which the reader position must be held unchanged, since the shorter this length, the easier it is for an operator of the reader to hold it fixed in position. To this end, the prior art solution is to increase the scan rate, thus reducing the length of time in which the reader position must be held constant. However, in order for the reader to function properly when the scan rate is increased, it is necessary to replace the relatively low speed and relatively inexpensive decoders conventionally used by new decoders which function at much higher speeds and which are much more expensive.

The present invention is directed toward another solution for reducing the length of time in which the reader must be held fixed in position which does not use increased scan rates. Consequently, superior results are obtained in a much simpler and less expensive manner.

SUMMARY OF THE INVENTION

Accordingly, it is an object of the present invention to provide a new and improved bar code reader using an LED array having at least one LED to direct light upon the bar code to be read and a linear CCD array to receive the resultant reflected light wherein the total energy of the reflected light is maintained at the conventional required level but wherein this energy is delivered at a very high level during a small fraction of the first period, rather then being delivered at a much lower level during the entire first period.

Another object is to provide a new and improved bar code reader of the character indicated wherein the LED array is pulsed in a novel manner to deliver the required total energy at high light levels during a small fraction of the first period rather than delivering light continously at a much lower light level during the entire first period.

Another object is to provide a new and improved circuit for pulse exciting an LED array having at least one LED in a bar code reader in such manner that a battery power supply cannot be overloaded during pulse excitation.

These and other objects and advantages of this invention will either be explained or will become apparent hereinafter to those skilled in the art.

In accordance with the principles of this invention, a bar code reader employs an LED array having at least one LED. This LED array, when energized, directs light upon a bar code.

A linear CCD array receives a portion of the light which is directed onto the bar code by the LED array and thereafter reflected from the bar code onto the CCD array. The total energy in that portion of the reflected light received by the CCD array has a value which is sufficient to enable the CCD array to absorb this energy and to build up the appropriate electric charge during a first period and to enable the CCD array, during a second period in which no light is received, to transfer this charge to a shift register.

Means coupled to the LED array energizes the LED array in such manner as to cause it to emit at least one pulse of light during a small fraction of the first period. The value of the total energy contained in the reflected light delivered to the CCD array by the light pulse is equal to said sufficient value. In this manner, the advantageous results of the invention are obtained.

In order to cause the LED array to emit such light pulses, the LED array is connected between first and second terminals. A direct voltage from a power supply is applied between third and fourth terminals.

First and second electronic switches each have mutually exclusive conductive and non-conductive electric states. The two switches function in opposite sense so that, when either one of the switches is in its conductive state, the other switch is in its non-conductive state.

The first switch is connected in series with a current limiting resistor between the first and third terminals, the resistor being disposed between the first switch and the first terminal. The second switch is connected between the second and fourth terminals. The first switch is placed in its conductive state upon application thereto of a control pulse and is otherwise in its non-conductive state.

At least one capacitor is connected between the fourth terminal and the junction of the resistor and the first terminal.

Control pulses are periodically applied to the first switch. During the periods between the application of successive pulses, the second switch is conductive. Current, maintained by the current limiting resistor to a maximum value which will not interfere with proper functioning of the reader, flows through the capacitor and the voltage thereacross increases to a maximum at the instant that a control pulse is applied. During the duration of this pulse, the voltage across the capacitor rapidly decreases to a minimum while the LED array is pulse excited by the current flow produced by this rapidly decreasing voltage and emits the desired pulse.

The current limiting resistor, by limiting the current flow, prevents improper functioning of the reader in a manner described in more detail below.

DETAILED DESCRIPTION OF PREFERRED EMBODIMENTS

Figure 1:
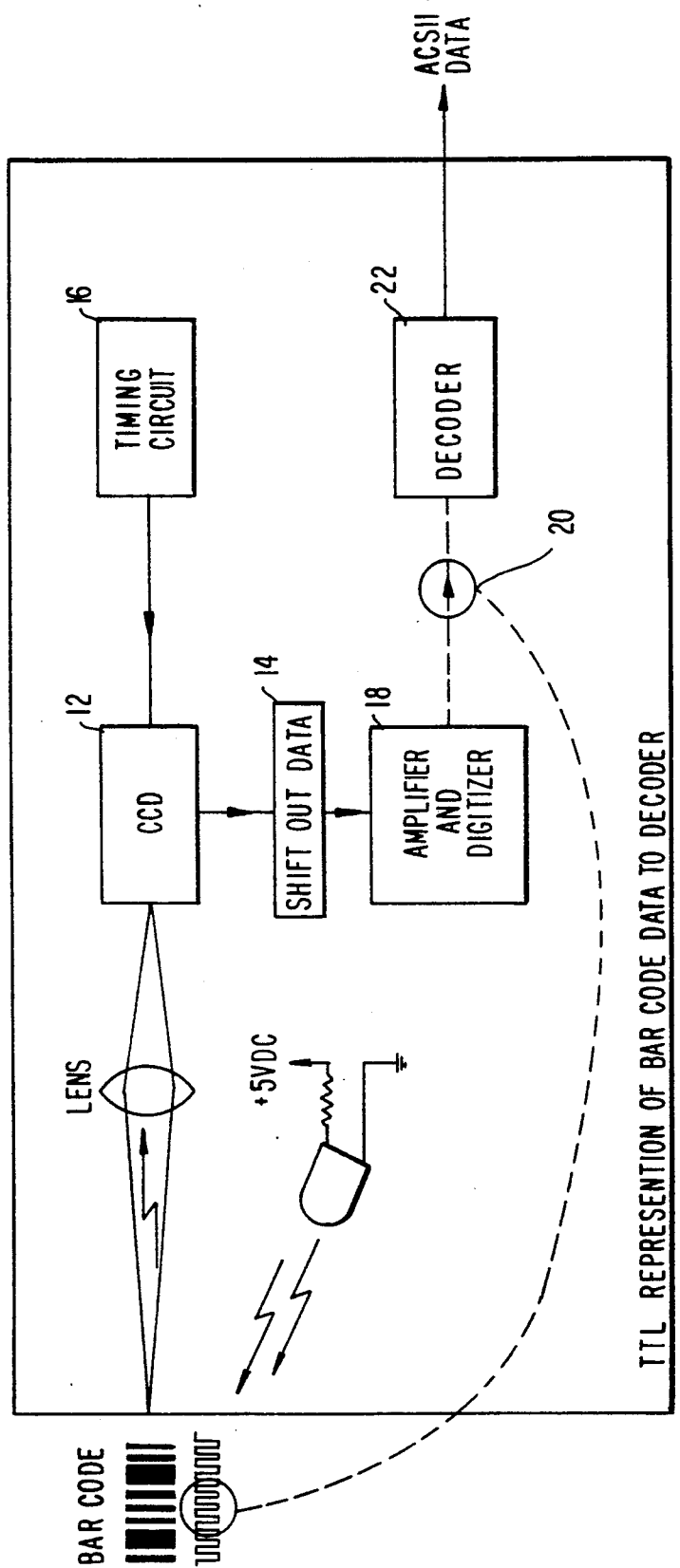
FIG. 1 is a block diagram illustrating the general system organization of a bar code reader.

Referring now to FIG. 1, the bar code reader employs a LED array 10, a CCD array 12, a shift register 14, a timing circuit 16, an amplifier and digitizer 18, a T L logic output 20 and a decoder 22. The reader is to read a bar code 24.

Figure 2:
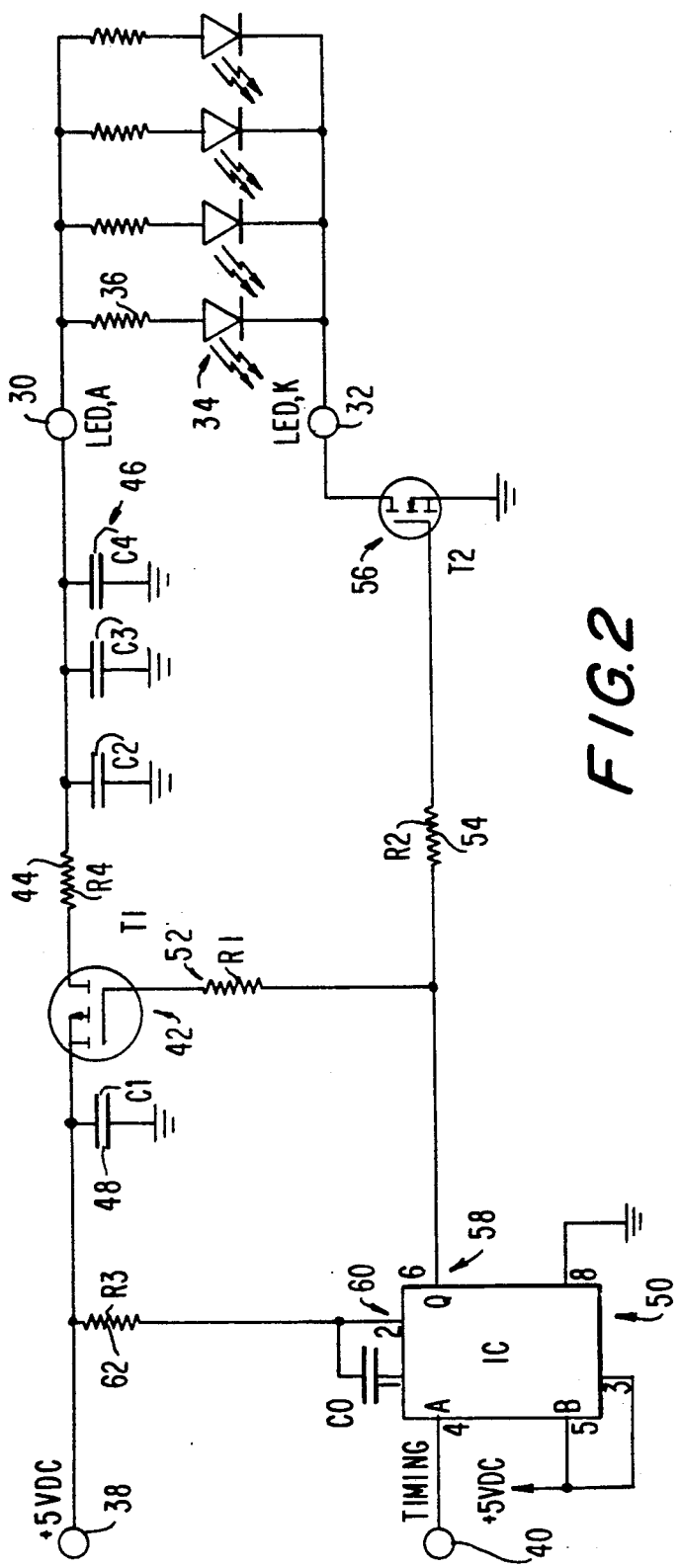
FIG. 2 is a circuit diagram of an LED array pulse control circuit in accordance with a preferred embodiment of this invention.
Figure 3:
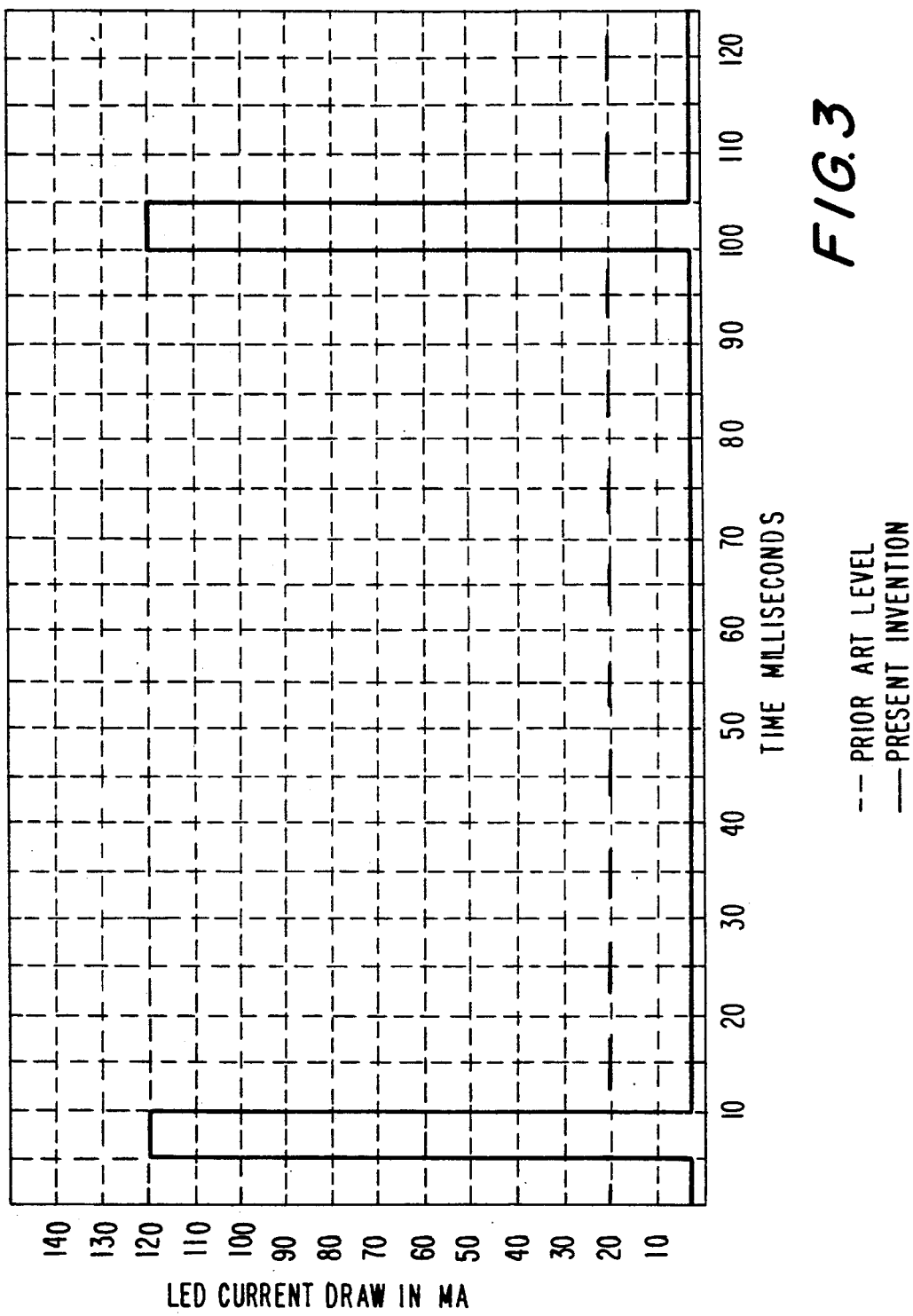
FIG. 3 is a graph comparing the LED current vs time characteristic of the circuit of FIG. 2 with the corresponding LED current vs time characteristic of the prior art.

Referring now to FIGS. 2 and 3, the LED array is connected between terminals 30 and 32. Each of the four LEDS 34 is connected in series with a corresponding resistor 36 between these terminals. A voltage of five volts is employed with terminal 38 being maintained at a positive potential of five volts. Terminal 38 is connected through the current path of p channel type field effect transistor 42 and current limiting resistor 44 to terminal 30. The junction of resistor 44 and terminal 30 is grounded for alternating currents through three parallel connected capacitors 46. These capacitors store and release energy in accordance with the requirements of this invention.

The junction between terminal 38 and transistor 42 is bypassed through capacitor 48. A pulse generator in this embodiment takes the form of an integrated circuit unit 50 which is a monstable multivibrator. Unit 50 has a lead 58 connected via resistor 52 to the gate electrode of transistor 42 and via resistor 54 to the gate electrode of field effect transistor 56. Transistor 56 is an n channel device which is opposite to transistor 42. The current path of transistor 56 is connected between terminal 32 and ground. Another lead 60 of unit 50 is connected via resistor 62 to the junction of terminal 38 and capacitor 48.

The transistors 42 and 56 function as on-off electronic switches. Since they are of opposite type, they act in reverse sense, that is when one transistor is conductive, the other one is non-conductive.

When the multivibrator delivers a single positive short output pulse, transistor 56 is triggered into conduction and transistor 42 is non-conductive. Current flows through the LED array and a light pulse is produced. The output pulse and the light pulse are essentially time coincident.

Upon the termination of the output pulse, transistor 56 becomes non-conductive and transistor 42 is triggered into conduction. A charging current, limited by current limiting resistor 44, flows into capacitors 46 and the voltage thereacross begins to increase. A control signal from the timing circuit is applied to terminal 40 to determine the instant at which the multivibrator produces the output pulse so that the multivibrator pulse is produced at the time at which the first period begins. The light pulse is produced at essentially the same time.

When the output power level of the power supply is high relative to the power consumption of the circuit of FIG. 3, the voltage level of the supply will not change despite increases in power consumption of the circuit. However, when the output power level of the supply is not so high, as for example, when the power supply is a battery, the voltage level can be reduced due to the power drain as the power consumption of the circuit increases. The circuit of FIG. 3 can be powered by a battery. In this situation, a reduction in voltage level can cause the reader to produce improper bar code reading or perhaps to produce no reading whatsoever. The limiting resistor limits the rate of increase of charge on the capacitors during charging to a maximum level which will not cause any reduction in voltage level.

The resultant wave forms are shown in FIG. 3. The light pulse or pulses produced by the LED array in accordance with the invention have a total duration of about five percent of that of the total of the first and second periods as compared with the one hundred percent duration of the prior art usage. The prior art LED current is shown to have a constant value equal to about one sixth of the peak LED current as utilized in the invention.

While the invention has been described with particular reference to the preferred embodiments and the drawings, the protection sought is to be limited only by the terms of the claims which follow.

What is claimed is:

1. A bar code reader comprising:
   an LED array containing at least one LED which is connected between first and second terminals and is adapted when energized to direct light upon a bar code;
   a linear CCD array adapted to receive a portion of the light directed by the LED array onto the bar code and thereafter reflected from the bar code onto the CCD array, the CCD array receiving such reflected light and absorbing the energy therein, this energy having a value at which the CCD array will accumulate a sufficiency of electrical charge during a first period, the CCD array delivering said charge to a shift register during an immediately following second period;
   means connected between said first and second terminals to energize the LED array to emit at least one pulse of light during a fraction of said first period, the value of energy contained in the light pulse being sufficient to charge the CCD array, said means including first and second transistor switches which act in opposite sense so that when the first switch is conductive, the second switch is non-conductive, and when the second switch is conductive, the first switch is non-conductive, and also including a pulse generator to intermittently supply a control pulse to said first switch, the generator and the first switch having a common ground; and
   a circuit for controlling the timing of the first and second periods and supplying a control signal to said means to establish proper timing.

2. The reader of claim 1 wherein the generator produces at least one output pulse during each first period, the pulse when produced closing the first switch and opening the second switch, the first switch being opened and the second switch being closed in the absence of the pulse.

* * * * *